United States Patent [19]
Okuyama et al.

[11] 3,980,748

[45] Sept. 14, 1976

[54] PRODUCTION OF POLYETHYLENE TEREPHTHALATE FILM HAVING IMPROVED RESISTANCE TO CLEAVAGE

[75] Inventors: Hiroshi Okuyama; Hisao Takahashi; Akira Hasegawa, all of Minami-ashigara, Japan

[73] Assignee: Fuji Photo Film Co., Ltd., Minami-ashigara, Japan

[22] Filed: June 18, 1974

[21] Appl. No.: 480,325

Related U.S. Application Data

[63] Continuation-in-part of Ser. No. 207,970, Dec. 14, 1971, abandoned.

[30] Foreign Application Priority Data

Dec. 14, 1970  Japan.............................. 45-111584

[52] U.S. Cl.............................. 264/289; 264/235; 264/291; 264/346
[51] Int. Cl.²......................................... B29D 7/24
[58] Field of Search............... 264/288, 289, 210 R, 264/235, 346, 291, DIG. 51, DIG. 73

[56] References Cited
UNITED STATES PATENTS

| | | |
|---|---|---|
| 3,595,836 | 7/1971 | Korneli............................ 264/289 |
| 3,669,931 | 6/1972 | Annis et al...................... 264/210 R |

*Primary Examiner*—Robert F. White
*Assistant Examiner*—James B. Lowe
*Attorney, Agent, or Firm*—Sughrue, Rothwell, Mion, Zinn and Macpeak

[57] ABSTRACT

A process for the production of a polyethylene terephthalate film characterized by carrying out heat setting after biaxial elongation so that the heat set temperature and heat set time may satisfy the following relations:

| | |
|---|---|
| heat set temperature<br>$\log t \geq -0.14T + 10.99$ | 140–213°C. |
| heat set temperature<br>$\log t \geq -0.14T + 30.8$ | 213–223°C. |
| heat set temperature<br>$\log t \geq -0.0186T + 3.73$ | 223–255°C. | in which $T$ is a heat set temperature (°C.) and $t$ is a heat set time (min.), and thus obtaining a cleavage-free film.

3 Claims, No Drawings

PRODUCTION OF POLYETHYLENE TEREPHTHALATE FILM HAVING IMPROVED RESISTANCE TO CLEAVAGE

RELATIONSHIP TO OTHER APPLICATIONS

This application is a continuation-in-part of application Ser. No. 207,970, filed Dec. 14, 1971 now abandoned.

BACKGROUND OF THE INVENTION

1. Field of the Invention

This invention relates to a process for the production of a high molecular weight film and more particularly, it is concerned with a process for the production of a polyethylene terephthalate film having improved dynamic properties.

2. Description of the Prior Art

As is well known by the disclosure of U.S. Pat. No. 2,823,421, polyethylene terephthalate (which will hereinafter be referred to as PET) is capable of being formed into a film having excellent dynamic, optical and chemical properties by subjecting an amorphous and non-orientated sheet obtained by melt extrusion to elongation in two directions, vertical to each other, followed by heat treatment (heat setting) thereof. However, such a film has a disadvantage in that it is weak in strength, in particular, in the direction of thickness, and tends to break due to laminated stripping in a plane parallel to the film surface (which will hereinafter be referred to as cleavage). This disadvantage lowers the practical value of the PET film and, in some fields, restricts the use thereof.

In coating a PET film surface with a photographic emulsion layer, recording a magnetic layer or metallic plating layer, there often occurs breaking due to cleavage in the interior of the PET film itself, not in the interior of the coating layer or boundary thereof, resulting in deterioration of the value of the film, when force to strip the coating layer is applied to the coating composition. When such a PET film is used as a support of a photographic light-sensitive material for printing, it is impossible to carry out a cutting operation which is ordinarily required to partly take a printed image, because during the cutting operation cleavage takes place near the cut end, which cleavage causes irregular scattering of light and further trouble in the subsequent step of printing.

It is a principal object of this invention to provide a biaxially elongated PET film that has increased strength in the direction of thickness, and can be used without the formation of cleavage, whereby the above-mentioned disadvantages are overcome.

Previous attempts to overcome the foregoing disadvantages while retaining the excellent properties of PET film have been disclosed in Japanese Patent Publications Nos. 9859/69, 29274/69 and 31827/69. In Japanese Patent Publication No. 9859/69 there is mentioned, as a data recording material, a PET film which has an intrinsic viscosity of more than 0.82 and is biaxially elongated and heat set. The stripping resistance (cleavage resistance) of such a material is improved, but, as mentioned in this publication, the melt viscosity of PET having a high intrinsic viscosity is so large that it is very difficult to effect film making at machine commercial speeds. In chemcially synthesizing the raw PET material, it is well known that PET having a high intrinsic viscosity is economically disadvantageous.

In Japanese Patent Publication No. 29274/69, a method for improving the dimensional stability, strength in the direction of thickness and zero strength temperature is mentioned, which comprises copolymerizing one or more monomers capable of making a polymer photosensitive with a polyester such as PET, forming the polymer into a film and making the polymer three-dimension through bridging of the photosensitive unit. This method, however, has the disadvantage that a special copolymer is required as a raw material, and following the ordinary forming step a bridge making step by light radiation is necessary. Moreover, it is necessary to recover and reuse trimming edges which are formed during the production of a PET film in large amounts. This recovery is ordinarily carried out by crushing trimmed edges and then feeding them to the molding step in the form or polymer, or by chemically decomposing to the monomer and then reusing as a part of the raw material. The former is, of course, better. However, a film having three-dimensionally bridged bonds as mentioned in this publication cannot be re-melted and, therefore, there is no economical method for the recovery of trimmed edges.

In Japanese Patent Publication No. 31827/69 there is mentioned a method wherein 0.25 – 10% by weight of inactive titanium dioxide granules having an average size of 0.1 – 0.6 micron are incorporated into the film so as to lower the tendency of thin layer cleavage of a PET film used as a reinforcing film for textiles. The granules are added during the steps of forming the polymer into a film or synthesizing the polymer. Such addition needs a special technique, which may be complicated, to uniformly disperse the granules. Since high transparency is required for a PET film used as support of a photographic material, the lowering of transparency due to addition of such granules is such a serious disadvantage that it cannot be put to practical use.

SUMMARY OF THE INVENTION

We, the inventors, have made studies to prevent a biaxially elongated PET film from cleaving from a completely different point of view from the above-mentioned methods and, consequently, found a markedly effective method. That is to say, it was found that a cleavage-free film can be produced by carrying out a treatment for a constant time ($t$) or more, correspondingly to a heat set temperature (T), when heat set under tension after having been biaxially elongated. The relation of the heat set temperature and required treatment time is represented by the following three formulas depending on the range of the heat set temperature, in which T is a heat set temperature (°C.) and $t$ is a required treatment time (minutes).

| Heat set temperature range | Relation |
|---|---|
| 140 – 213°C. | $\log t \geq -0.0470T + 10.99$ |
| 213 – 223°C. | $\log t \geq -0.14T + 30.8$ |
| 223 – 255°C. | $\log t \geq -0.0186T + 3.73$ |

DETAILED DESCRIPTION OF THE PREFERRED EMBODIMENTS

In order to use a PET film as a support in combination with a photographic emulsion layer, recording magnetic substance layer or metallic plating layer, not only excellent dynamic, optical and chemical properites, but also uniformity in thickness is especially required. Uniformity in thickness can be obtained by elongating three times or more in the lateral and longitudinal directions an amorphous, non-orientated sheet obtained by melt extrusion during the production of a PET film. It is known that the properties of a biaxially elongated PET film are remarkably improved by a heat treatment under tension. In U.S. Pat. No. 2,823,421, one feature thereof is a heat treatment at a temperature of 150°–250°C.. In British Pat. No. 838,708 there also is mentioned a heat treatment at a temperature of 150°–250°C.. The present invention covers these temperature ranges, but the above-mentioned two patents each refer to obtaining no cleavage of a PET film by the methods of the respective patents. The heat setting temperature is mentioned therein, but does not suggest a time required for obtaining a cleavage-free film at a particular heat set temperature or a heat set temperature required for obtaining a cleavage-free film in a certain heat set time. Therefore, the present invention is new and compares favorably with the known art as mentioned in Japanese Patent Publication Nos. 9859/69, 29274/69 and 31827/69. Whilst these known arts have many restrictions on economic and technical points, the method of the present invention can be practiced using conventional apparatus for the production of a PET film without using a particular polymer differing from that of the known art, and without adding special steps and, in addition, there are no restrictions on recovery of scraps such as trimmed edges.

In the process of the invention, in addition to heat setting conventional process steps can be carried out.

Characteristics of the polyethylene terephthalate are not limited, but the intrinsic viscosity thereof is more than 0.4, preferably 0.4 to 0.8, more preferably 0.58 to 0.65.

The following examples are to illustrate the invention in detail without limiting the same.

EXAMPLE 1

PET chips having an intrinsic viscosity of 0.65 were dried at 160°C. for 4 hours by hot air, subjected to melt extrusion by an extruder and rapidly cooled to obtain an amorphous, non-orientated sheet. Using an elongating machine, the resulting sheet was elongated by three times the original length in the lateral and longitudinal directions at a temperature of 80°C. and an elongation speed of 24,000%/min. to give a film thickness of 120μ. This film was fixed by a metal frame, heat set for various periods of time by means of an air thermostat at a predetermined temperature and torn by means of an Ellmendorf tearing tester to test for cleavage. The presence of cleavage on the torn surface could readily be seen with the naked eye. The results are shown in Table 1. In cases where there is no cleavage the respective heat set times and heat set temperatures satisfy the foregoing relation.

Table 1

| Heat Set Temperature | Heat Set Time | Cleavage |
| --- | --- | --- |
| 140°C. | 500 minutes | cleavage |
| " | 20,000 minutes | cleavage |
| " | 25,700 minutes | no |
| 190°C. | 5 minutes | cleavage |
| " | 50 minutes | cleavage |
| " | 250 minutes | no |
| 210°C. | 30 seconds | cleavage |
| " | 3 minutes | cleavage |
| " | 30 minutes | no |
| 230°C. | 10 seconds | cleavage |

Table 1-continued

| Heat Set Temperature | Heat Set Time | Cleavage |
| --- | --- | --- |
| " | 20 seconds | no |
| " | 30 seconds | no |
| 240°C. | 10 seconds | cleavage |
| " | 20 seconds | no |
| 250°C. | 5 seconds | cleavage |
| " | 10 seconds | no |
| 255°C. | 3 seconds | cleavage |
| " | 6 seconds | no |

EXAMPLE 2

The same PET chips as in Example 1 were subjected to melt extrusion to form a sheet, which was then elongated by 3.4 times the original length in the longitudinal direction and 3.7 times in the lateral direction and subsequently heat set for 45 seconds at 245°C. to give a film of 0.1 mm thickness. When the resulting film was torn by an Ellmendorf tearing tester, there was found no cleavage.

When the heat set temperature was 220°C. for comparison, there was a cloven surface of 1–2 mm in width on the torn area.

The mechanical strength and optical haze of these two films are shown in Table 2.

Table 2

| Heat Set Temperature | Tensile Strength (kg/mm$^2$) | | Elongation (%) | | Tearing Strength (g/cm) | | Haze (%) |
| --- | --- | --- | --- | --- | --- | --- | --- |
|  | (1) | (2) | (1) | (2) | (1) | (2) |  |
| 245°C. | 20.4 | 18.1 | 135 | 155 | 135 | 144 | 0.5 |
| 220°C. (comparison) | 24.8 | 20.8 | 106 | 124 | 106 | 109 | 0.6 |

(1) longitudinal
(2) lateral

In the case of the invention, the tensile strength becomes somewhat lower and the elongation and tearing strength increase as compared with the Comparative Example, but there is little difference in haze. However, these differences matter little, practically.

At times, the addition of various additives, such as hydrated aluminum silica, to the polyethylene terephthalate composition so that they are found in the polyethylene terephthalate film, interferes with and prevents the improvements found by applicants concerning improved resistance to cleavage of polyethylene terephthalate films treated in accordance with this invention. For example, when hydrated aluminum silica as taught by U.S. Pat. No. 3,669,931 by Annis et al. is incorporated into a polyethylene terephthalate film and then the film is subjected to processing conditions falling within the present invention, improved resistance to cleavage does not result. Other additives also may interfere with the present invention and the skilled artisan can recognize such additives by comparing their characteristics to hydrated aluminum silica or can easily determine such additives by producing a sample polyethylene terephthalate film containing the additive in question and then subjecting the film to processing conditions in accordance with this invention.

The following two comparative examples illustrate the above-discussed additive effect.

EXAMPLE 3

A polyethylene terephthalate film was processed in accordance with the following data concerning the biaxial elongation thereof in the lateral and longitudinal directions and the heat-setting thereof following such biaxial stretching:

| | |
|---|---|
| Draw ratio | 3 × 3 |
| Drawing temperature | 90°C |
| Heat-treating temperature | 225°C |
| Heat-treating time | 5 minutes |
| Density (degree of crystallization) | 1.396(50%) |

Polyethylene terephthalate films which did not contain any hydrated aluminum silica were found to not be characterized by cleavage when subjected to the above processing conditions, while when polyethylene terephthalate films containing 0.1 wt. percent of hydrated aluminum silica (Satintone No. 5, the Engel Hard Company, containing $SiO_2Al_2O_3$ as a main compound with a particle diameter size of 0.5 microns) was used, cleavage was found in the film when processed in accordance with the above processing parameters.

EXAMPLE 4

Example 3 was repeated with the exception that the heat-treating time was 30 seconds instead of 5 minutes.

Similar to Example 3, cleavage was observed in the polyethylene terephthalate films containing the 0.1 wt. percent of hydrated aluminum silica while the polyethylene terephthalate films which did not contain any hydrated aluminum silica were found not to be characterized by cleavage when subjected to the processing conditions of this Example.

Variations of this invention will be apparent to one skilled in the art.

What is claimed is:

1. A process for the production of a polyethylene terephthalate film consisting essentially of polyethylene terephthalate, said film having improved resistance to cleavage, characterized by carrying out heat setting said film consisting essentially of polyethylene terephthalate after a biaxial elongation by a factor of at least three in the lateral and longitudinal directions so that the heat set temperature and heat set time satisfy one of the following relationships:

| | |
|---|---|
| heat set temperature $\log t \geq -0.0470T + 10.99$ | 140–213°C |
| heat set temperature $\log t \geq -0.14T + 30.8$ | 213–223°C |
| heat set temperature $\log t \geq -0.0186T + 3.73$ | 223–255°C | in which T is a heat set temperature (°C) and $t$ is a heat set time (min).

2. A process for the production of a polyethylene terephthalate film as claimed in claim 1, wherein said polyethylene terephthalate has an intrinsic viscosity of more than 0.4.

3. A process for the production of a polyethylene terephthalate film as claimed in claim 1, wherein said polyethylene terephthalate has an intrinsic viscosity of between 0.58 and 0.65.

* * * * *